United States Patent
Lipton et al.

(10) Patent No.: US 7,616,228 B2
(45) Date of Patent: *Nov. 10, 2009

(54) HARDWARE BASED INTERDIGITATION

(75) Inventors: Lenny Lipton, Greenbrae, CA (US); Mark H. Feldman, Walnut Creek, CA (US); Robert Akka, Fairfax, CA (US)

(73) Assignee: Real D, Beverly Hills, CA (US)

( * ) Notice: Subject to any disclaimer, the term of this patent is extended or adjusted under 35 U.S.C. 154(b) by 684 days.

This patent is subject to a terminal disclaimer.

(21) Appl. No.: 11/118,516

(22) Filed: Apr. 29, 2005

(65) Prior Publication Data

US 2005/0195276 A1    Sep. 8, 2005

(51) Int. Cl.
  *H04N 13/00*    (2006.01)
  *H04N 13/04*    (2006.01)
(52) U.S. Cl. .......................................... 348/51
(58) Field of Classification Search .............. 348/42–60
  See application file for complete search history.

(56) References Cited

U.S. PATENT DOCUMENTS

| | | | |
|---|---|---|---|
| 6,266,281 B1 * | 7/2001 | Derhacobian et al. .. | 365/185.29 |
| 6,351,280 B1 * | 2/2002 | Benton ......................... | 348/51 |
| 6,591,088 B1 * | 7/2003 | Watanabe ................... | 455/90.3 |
| 2002/0011969 A1 * | 1/2002 | Lipton et al. .................... | 345/8 |
| 2002/0036825 A1 * | 3/2002 | Lipton et al. ................. | 359/463 |
| 2002/0180688 A1 * | 12/2002 | Drzaic et al. ................. | 345/107 |
| 2005/0270261 A1 * | 12/2005 | Danner et al. .................. | 345/84 |

* cited by examiner

*Primary Examiner*—Nhon T Diep
(74) *Attorney, Agent, or Firm*—Baker & McKenzie LLP (57) ABSTRACT

A system and method for interdigitating multiple perspective views in a stereoscopic image viewing system. A lenticular sheet is affixed in intimate juxtaposition with a display area having a defined aspect ratio. The display area includes a plurality of scan lines each having a plurality of pixels, each pixel including subpixels. A map having the same resolution as the display is created to store values corresponding to each subpixel in the display area. Preferably, the map is generated beforehand and stored for later use through a lookup operation. A buffer stores a frame having n views, wherein each of the n views has the same aspect ratio as the display area. A plurality of masks is also created and stored. Each mask corresponds to a unique one of the n views and includes opaque areas and a plurality of transparent windows, each of which corresponds to a selected subpixel location. The n views are then interdigitated while applying the corresponding masks, and a value is assigned to each subpixel using the map.

15 Claims, 8 Drawing Sheets

HARDWARE BASED INTERDIGITATION

BACKGROUND OF THE INVENTION

Lenticular-based autostereoscopic displays, such as StereoGraphics' SynthaGram® display, present the user with a realistic stereoscopic visual scene representation by displaying multiple perspective views. The user's eyes see a pair of images from the array of perspective views and a stereoscopic image is formed in the user's mind.

The SynthaGram® display utilizes a lenticular lens array, which is precisely positioned on top of a flat panel digital color display (e.g., LCD and plasma) and is thus used to optically separate the views, which have been combined in the displayed image. This combination process, known as interdigitation or Interzigging™, is a precise mapping of input perspective views to output subpixel components and takes into account the physical properties of the lenticular array and its alignment with the display. The input perspective views are assumed to be created in a digital format, properly composed, aligned, balanced, have appropriate parallax, and each can be of the same horizontal and vertical pixel dimensions. These perspective views can be created by numerous techniques including photography and computer graphics software.

The art of the SynthaGram® display is covered in U.S. Pat. No. 6,519,0888 entitled "Method and Apparatus for Maximizing the Viewing Zone of a Lenticular Stereogram," and U.S. Pat. No. 6,366,281 entitled "Synthetic Panoramagram." The art of the SynthaGram® display is also covered in U.S. Publication No. 20020036825 entitled "Autostereoscopic Screen with Greater Clarity," and U.S. Publication No. 20020011969 entitled "Autostereoscopic Pixel Arrangement Techniques."

Display pixels are composed of a set of adjacent subpixels, typically organized in a red-blue-green pattern. We will assume in this disclosure that the subpixels are truly adjacent, however the reality is that a small "grout" boundary surrounds each subpixel. The interdigitation mapping describes the correct assignment of subpixels in the perspective views to subpixel elements in the display. The mapping is uniquely based on the size and physical properties of the lenticular lens sheet. Such properties include the pitch of the lenticulars on the sheet, and the slant angle of the lenticulars relative to the flat panel color display. The interdigitation mapping assumes that the display resolution has a fixed pixel dimension (e.g. 1600× 1200 pixels). Note that the pixel display format (e.g. 32 bits per pixel or 16 bits per pixel) is not a factor in creating the interdigitation mapping.

In composing an autostereo image, it is common (although not necessary), for the individual perspective views to be of smaller resolution than that of the final displayed image. In our embodiment we utilize 9 perspective views, but it will be clear to those skilled in the art that there is no loss in generality if more or less views are used. We have found when using nine views in out SynthaGram® system, the individual perspective views can be ⅓ the horizontal and vertical resolution of the final displayed autostereo image without any loss of detail.

It is also important to note that the aspect ratio of the individual perspective views is not required to be the same as the displayed image. Well known scaling and centering operations can be used to properly compose and present an interdigitated image in such cases.

Computing the interdigitation mapping is an essential step in computer software based autostereo composition programs. Although the interdigitation mapping relates perspective view subpixel locations to display subpixel locations, this mapping can be simplified. The simplification is based on realizing that the locations in the views and the display pixel locations are proportional to one another. Hence, simply determining which view is mapped to each display subpixel location will suffice for defining the interdigitation mapping. Therefore, once we can determine the correct view to map to a subpixel in the final displayed image, the actual color value to use in the view is determined by selecting the color subpixel at the proportional location in the displayed image.

The computation of interdigitation mapping is disclosed in U.S. Publication No. 20020011969, and is a process we call INTERZIGGING™. In this disclosure, we often use the generic term interdigitation because the process we describe is applicable to interdigitation procedures in general, as well as our proprietary INTERZIG™ process. The length of time to calculate this map is directly proportional to the resolution of the autostereo display. The mapping is one-to-one and uniquely defines the intermixing of perspective views to the subpixels in the displayed image. Stereoscopic properties such as the zero-parallax location in the viewed scene and parallax strength are already inherently expressed in the perspective images, which are considered input to the process and are not affected by the interdigitation mapping.

Our research with the SynthaGram® technology has led us to the conclusion that applying a special filter by a convolution process can produce an improved, sharper effect. Experiments have determined that this filter is best applied as a post process to the interdigitated image in a manner similar to any other filtering process.

There are various categories of computer applications that can be designed for use with such an autostereoscopic display. Such categories can include still image viewing, movie viewing, and real-time interactive animation or simulation. Although windowed computer applications are also supported on autostereoscopic displays, our discussion here is focused on full screen applications. It should be obvious to those skilled in the art that the hardware-based implementations we discuss below are readily adaptable to windowed-based computer applications.

Given the high computational cost of creating the interdigitation mapping, it is advantageous to minimize the number of times the mapping is calculated. Thus, rather than calculating the mapping on each video frame or animation update, the mapping can be computed directly in memory or read from disk file at program initialization, once the desired output monitor and number of views is selected or known.

The trade off between reading the mapping from a disk file or calculating "on-the-fly" is a software application design consideration: increase initialization time versus larger disk space requirements for the application. In either case, the application constructs the interdigitation mapping in computer memory for later use.

The naive software-only approach for using the interdigitation mapping, without leveraging the power of graphic hardware, would be to build an output autostereo image display by iterating through each output subpixel component, selecting the perspective view as indicated by the interdigitation mapping, and then determining the subpixel color value by a proportional lookup in the selected perspective view. Although this lookup approach is computationally expensive, it may be totally acceptable for an image viewer application, which does not require a high output frame rate.

A more efficient approach is to leverage the graphics and image processing capabilities found in the graphics processing units (GPU's) found on state-of-the-art graphics hardware. These graphics cards contain sufficient memory to hold textures and geometry, do lighting and texture operations, and implement the standard graphics transformations in a pipeline approach. These cards are also are programmable, allowing for assembler language-like programs to run and perform calculations per geometric vertex (vertex shaders) and per pixel (pixel shaders). High-level graphics languages such as DirectX and OpenGL have been enhanced to provide application support for these graphic card features. New higher level languages such as Cg and HLSL also aid in giving software implementers the opportunity to migrate complex algorithms such as interdigitation to the graphics card level, without the need for writing code in a low level assembler-like language.

A special feature on these cards is the texture pipeline. In 3D graphics, textures are 1D, 2D or 3D arrays of color, which are essential in providing realistic coloring effects to geometric polygons (typically triangles). Pixels in these textures are called Texels. Textures have their own coordinate system, usually referenced by a uv coordinate system, to which polygons are mapped. This texture mapping is utilized as follows: Each vertex in the polygon is assigned a texture uv coordinate. The graphics engine can then interpolate the color over the entire polygon. A texture pipeline is a hardware implementation that allows textures to be combined in stages, building up a desired special effect. These stages are applied very efficiently to geometry in a single pass of the geometry. Specifically this is called either multiple texture blending or single-pass multitexturing. The present invention takes advantage of these built-in features to provide an effective interdigitation process.

SUMMARY OF THE INVENTION

The present invention provides a system and a method for interdigitating multiple perspective views in a stereoscopic image viewing system. A typical image display unit includes a display area with a defined aspect ratio. In a stereoscopic viewing system, a lenticular sheet is affixed in intimate juxtaposition with the display area. The display area includes a plurality of scan lines each having a plurality of pixels. Each pixel includes subpixels.

Initially, a map is created to store values corresponding to each subpixel in the display area. The map has the same resolution as the display. While it is possible to create the map on the fly, it is preferred that the map be generated beforehand and stored for later use through a lookup operation. A buffer is used to store a frame having n views, wherein each of the n views has the same aspect ratio as the display area. A plurality of masks is also created and stored. Each mask corresponds to a unique one of the n views and includes opaque areas and a plurality of transparent windows. Each of the windows corresponds to a selected subpixel location. The n views are then interdigitated while applying the corresponding masks, and a value is assigned to each subpixel using the map.

DETAILED DESCRIPTION OF THE INVENTION

This disclosure describes the design of a system to implement real time autostereoscopic interdigitation. Such a system can be incorporated into an interactive game or image/movie player. In most cases, the application can be based on a simple animation-based framework comprised of the following steps: startup, per frame loop, and cleanup.

The geometry we use for the interdigitation image processing steps is a simple quad (4 planar points), which is represented as 2 triangles sharing 2 vertices. Each of the vertices has up to 3 texture coordinates. The quad is scaled and projected such that it lies exactly in the plane of the display.

One approach is to leverage the texture pipeline on graphics cards to perform a series of masking operations which build up, view by view, the displayed output image. These masks are used as textures for a single visible quad. An alternative is to create a single shiftable mask, rather than one mask for each view.

Another approach is to use the programmability of a pixel shader to perform the interdigitation mapping by using 2 textures, one to reference the perspective views and another to reference the interdigitation mapping. Advantageously, a simple sharpening filter that can work effectively on interdigitated images can also be implemented as a pixel shader.

This disclosure is based on development of a software application that implements techniques using off-the-shelf graphics hardware, and hence performs real-time hardware-based interdigitation. The system has been implemented on a personal computer with an Intel Pentium chip having a 2.4 Ghz speed, running a Windows 2000 operating system, with a NVidia FX1000 pixel shading 2.0 level graphics card. The application software uses DirectX 9 graphics and is written in a C++ language. The pixel shading software uses Microsoft's HLSL (High Level Shading Language) and is written to support the PS 2.0 pixel shading language. It should be obvious that the techniques described in this disclosure could also be implemented in other similar languages including OpenGL, and Cg on other operating systems including Mac OS, Linux, and Unix, using other models and vendors graphics cards.

Figure 1:
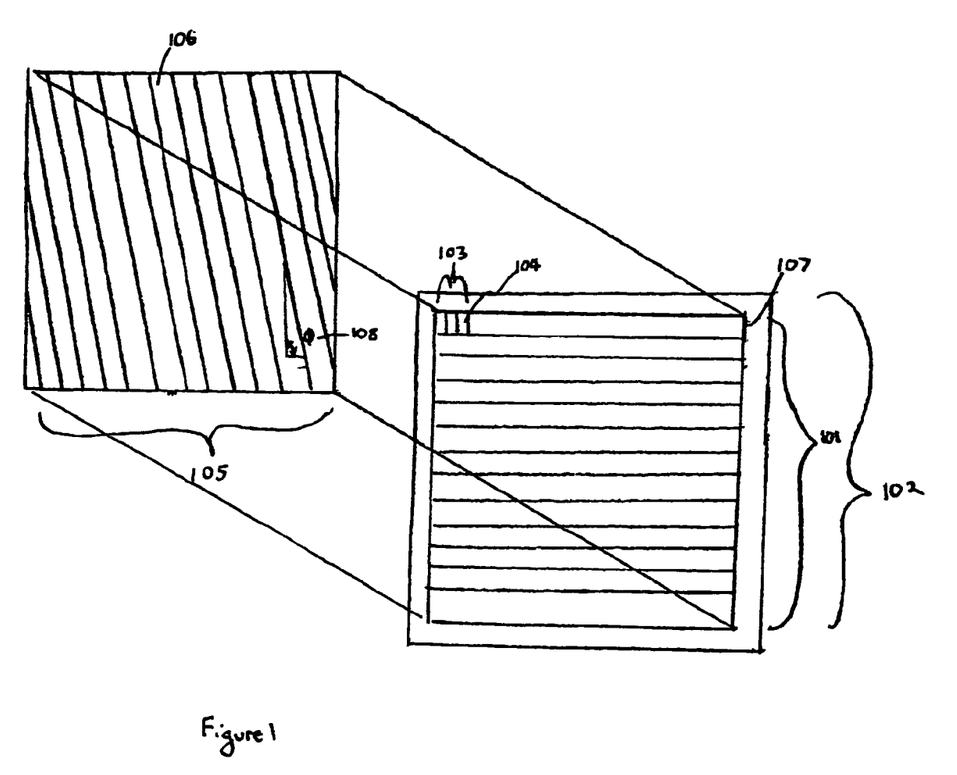
FIG. 1 shows a display with a lenticular screen attached.

Interdigitation of perspective views is necessary because of the physical relationship between a display and an adhered lenticular sheet. FIG. 1 shows the display area (101), which is part of a digital display monitor (102). The display area consists of an array of scan lines (107). Each scan line consists of a set of precisely positioned pixels (103) each of which is comprised of individually colored subpixels (104). A lenticular sheet (105) with an array of slanted lenticules (106) is precisely attached over the display area (101).

On any given scan line, a single lenticule will cover a non-integer number of subpixels. The optical properties of the lenticule causes the emitted light from these covered subpixels to be refracted at different angles towards a viewer. This phenomena is repeated for all lenticules over all scan lines. The design of the lenticular sheet (105) including the lenticular pitch (lenticules per inch) and slant angle Φ (108) (rotation of the lenticule to the vertical or traditional panoramagram orientation) is optimized such that the calculated interdigitation mapping of perspective views to subpixels will allow a complete representation of each perspective view to be projected in space towards a viewer. The viewer will thus be able to observe different views in both eyes and perceive a perspective representation.

Figure 2:
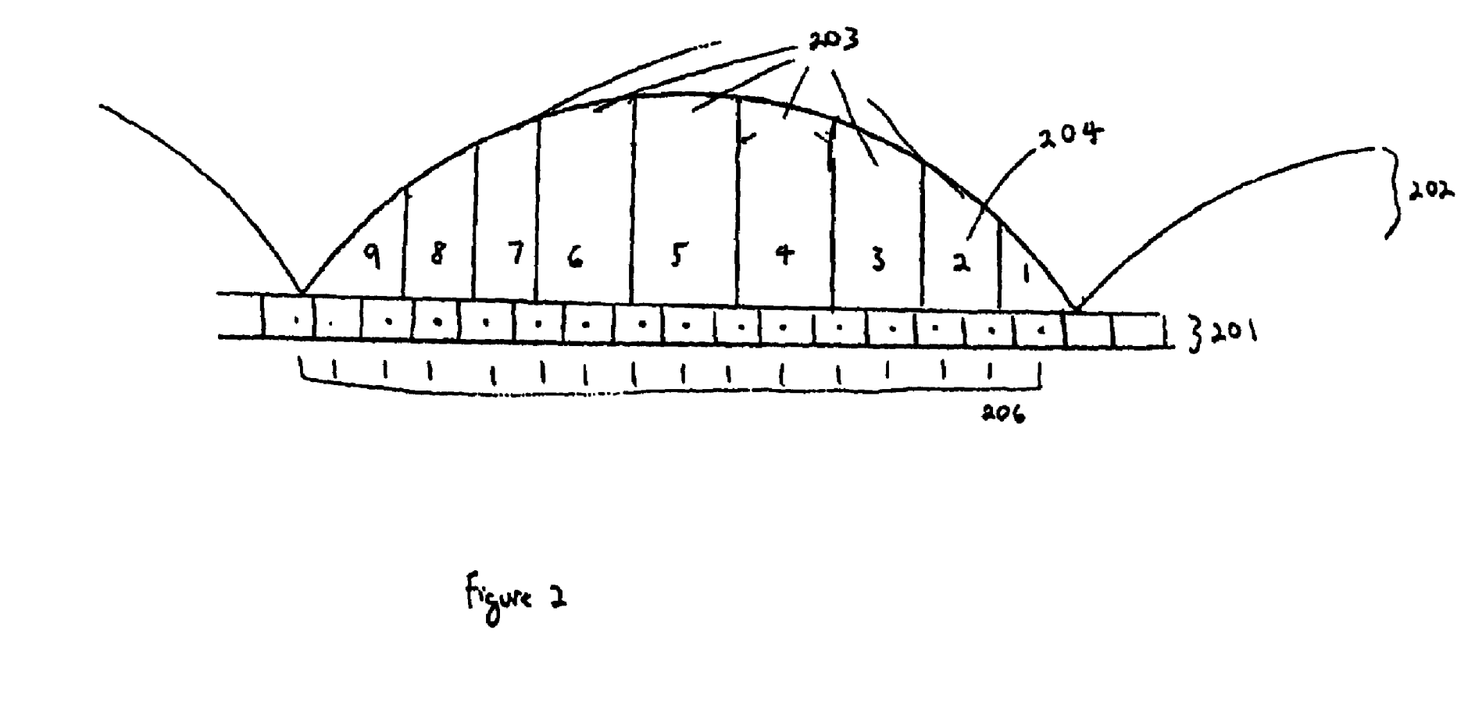
FIG. 2 shows a profile of a lenticule and the subpixels it covers.

The calculation of the interdigitation mapping is a known process and, as shown in FIG. 2, takes into account the position of the subpixels (201) under the array of lenticules (202). The width of a single lenticule is divided in an equal number of sections (203), depending on the number of perspective views which are to be projected. Each section is assigned a view number (204), which is reversed taking into account the refractive properties of the lenticule. For each subpixel in the display area, the position under the lenticule is determined and the appropriate section number is used as the view assigned. This assignment is based on which section the location of the center of the subpixel (206) lies in.

Figure 3:
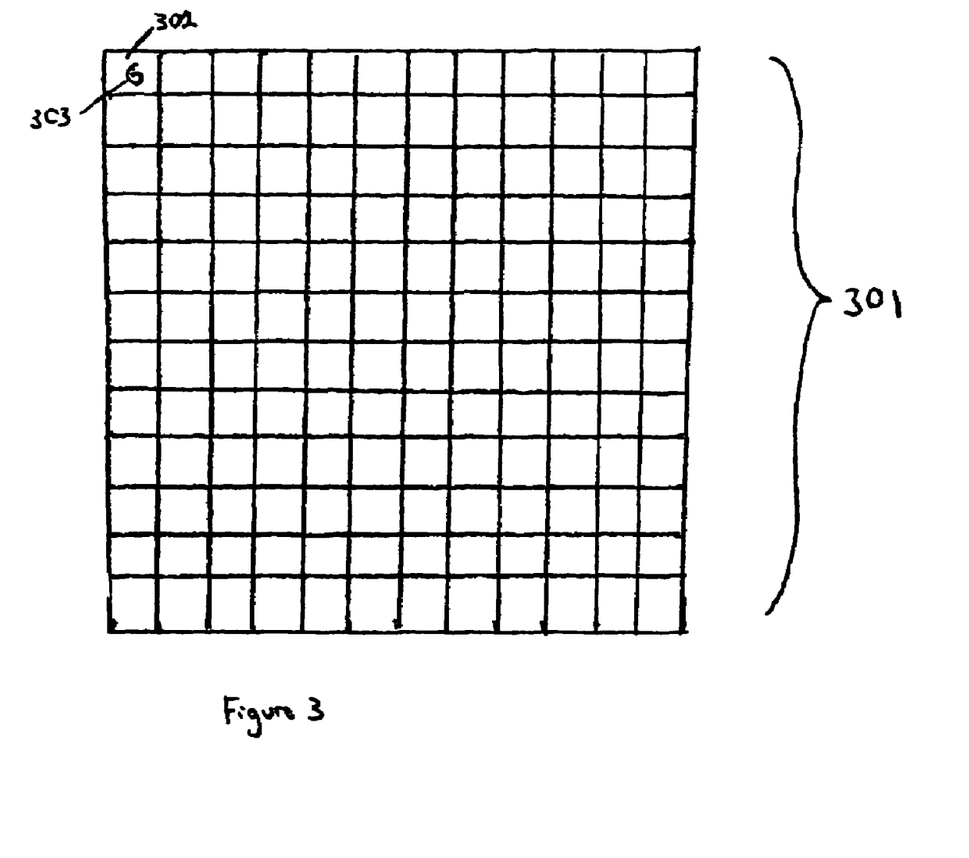
FIG. 3 shows the view map pattern, on which the interdigitation is based.

The result of this process is the interdigitation map shown in FIG. 3. The map (301) is at the same resolution as the display area. For each subpixel (302), a numerical value (303) is assigned which signifies the perspective view that is mapped to that subpixel. This map (henceforth called View-Map), serves as a foundation for both of the hardware based Interzigging processes described in this disclosure.

The ViewMap depends on the physical properties of the lenticular screen and the number of perspective views. Since most autostereo-based computer programs will support a single display and a fixed number of views, the ViewMap can be precomputed and stored on disk or calculated once at the beginning of the program. Because of its precision and lack of adjacent subpixel correspondence, the ViewMap is generally not compressible.

Figure 4:
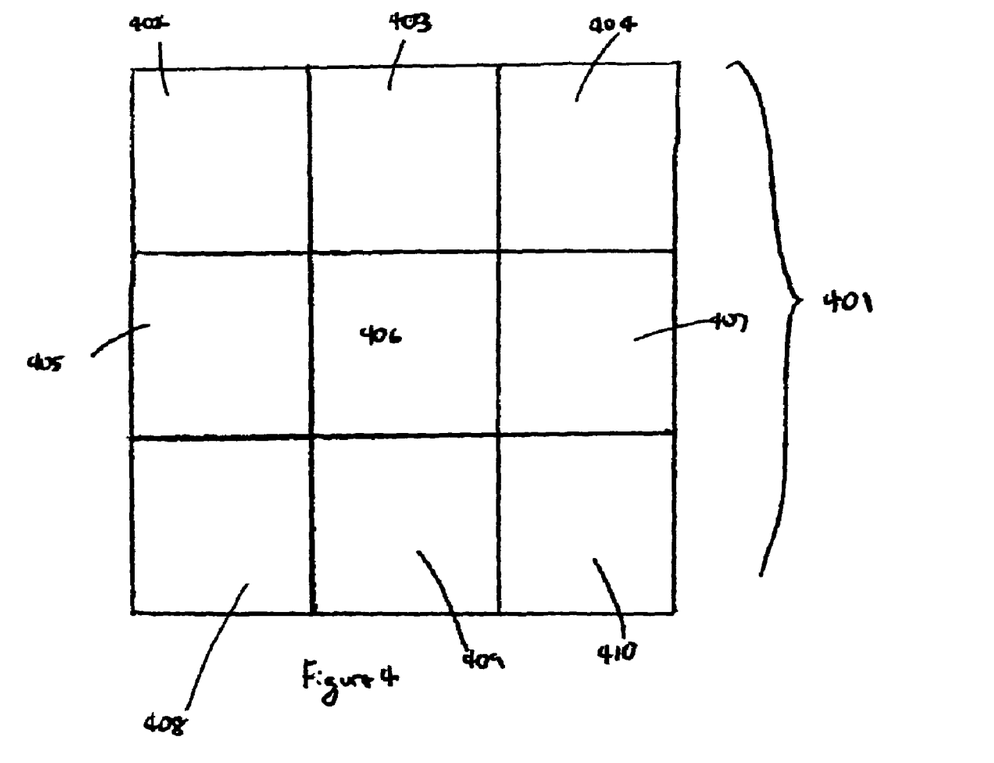
FIG. 4 shows the arrangement of a nine-tile layout.

For the system we are describing, the perspective views need to be efficiently organized in a non-overlapped fashion onto a single buffer. The layout of the perspective views in this buffer can vary widely, but because our standard is 9 views, our preferred implementation is a layout called "nine-tile". FIG. 4 shows the nine-tile layout where a single buffer (401) is divided into a geometry pattern of 9 tiles (402-410). Each tile is ⅓×⅓ is size of the single buffer (401). The upper left tile (402) is the leftmost perspective view, the center tile (406) is the center perspective view and the lower right tile (410) is the rightmost perspective view. The aspect ratio of the whole nine-tile buffer (401) by definition matches the aspect ratio of each tile. Because each perspective view is drawn to a tile, the aspect ratio of the tiles is set to that of the perspective view. Although we have standardized on 9 perspective views as a basis for our autostereo product, it will be clear to those versed in the art that the techniques we describe here are adaptable to other view quantities, and hence other layouts.

The Nine-Tile format has four major virtues, which make it ideal for our purposes, and these are enumerated here:

First, the nine-tile format can be compressed using industry standard jpeg, mpeg, and other codecs (compression-decompression systems). This solves a key problem with interdigitated content where a single pixel often contains information from 3 separate stereo views in each of the red, green, and blue color channels. Because of the lack of spatial coherency, this precise mapping gets destroyed when codecs are used such as those dependent on of block-based compression techniques.

Second, because the nine-tile format can be compressed, it provides a higher data rate from storage to display. Nine-tile content can be stored and played back with facility on digital storage mediums including disk drives, CDs, and DVDs. The higher data rate thus enabled allows for smoother playing video, and quicker data transfer rates, whether on a single computer or streaming over the internet.

Third, the format provides for SynthaGram monitor-invariant storage of content. Each SynthaGram monitor is defined with a unique set of numbers, which describe the optics of the lens sheet employed. These parameters include lenticular pitch (the number of lenticules per unit distance in a direction perpendicular to the axis of the lenticules), and Winnek angle. In U.S. Pat. No. 3,409,351, Winnek describes a process in which the lenticular axis is tipped at an angle to the vertical edge of the display, and this art is used in our process. Lenticular boundaries occur at the intersection of the arcs of the lenticular surfaces and the direction of these boundaries we define as the lenticular axis.

An Interzigged (interdigitated) image, therefore, can only be properly displayed if it is prepared during the Interzigging process using the correct parameters for that particular monitor model. By deferring the Interzigging process, and storing the perspective views in the intermediate nine-tile format, no monitor is implied in its definition. Only when the nine-tile format is Interzigged, is a specific monitor choice required.

Fourth, as a refinement of the above, each SynthaGram monitor supports a number of viewing distances at which an Interzigged image can be properly viewed. These viewing distances are defined by unique parameters or a set of numbers. The nine-tile format has the advantage of being viewing-distance invariant.

Figure 5:
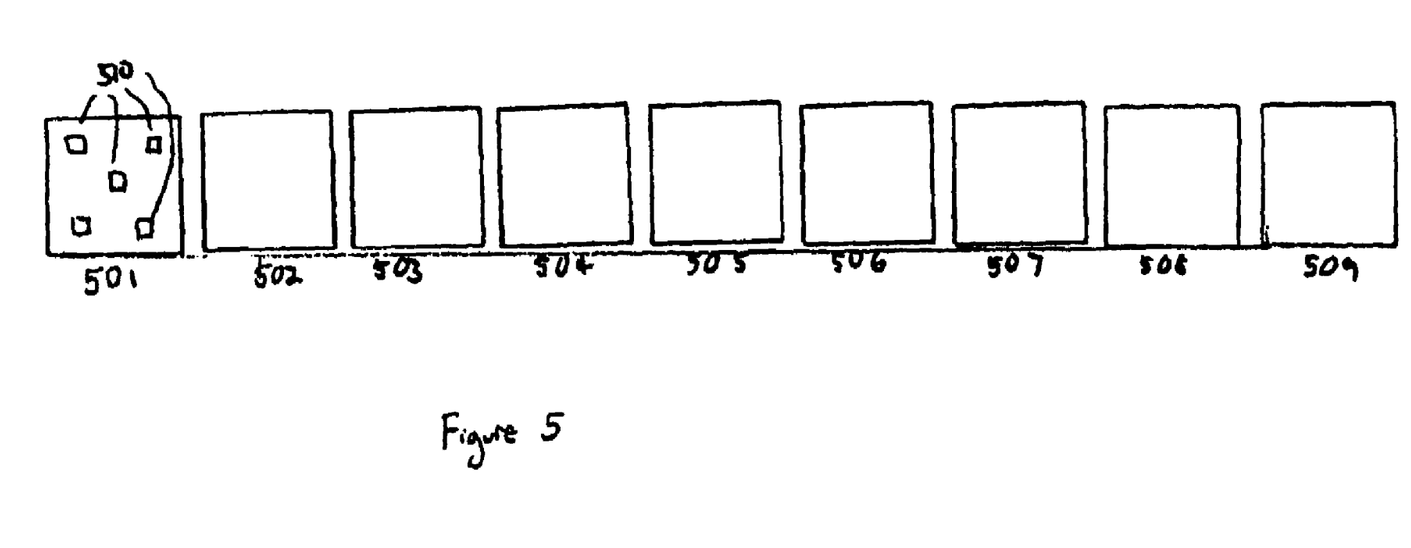
FIG. 5 shows the masks used for interdigitation.

The first hardware based interdigitation technique is called "masking". A series of masks are created to aid in the Interzigging process. As shown in FIG. 5, there is a single mask (501-509) for each of the perspective views. Each mask has the same subpixel dimensions as the display screen. The masks are completely opaque except that they contain numerous small windows (510) at each subpixel location where that corresponding perspective view is set in the ViewMap. On average 1/N of the area of the mask will be windowed, where N is the number of perspective views. When the masks are created, every subpixel location in the ViewMap will correspond to a single window in just one of the masks.

Figure 6:
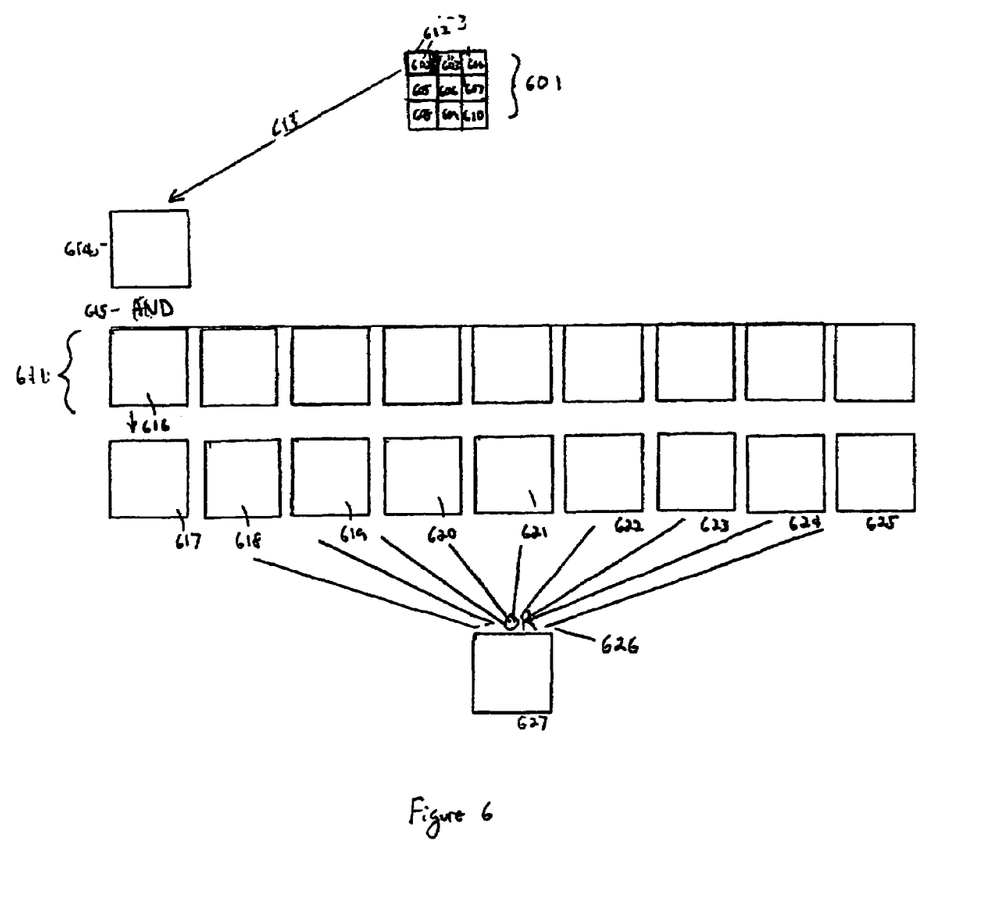
FIG. 6 describes the masking interdigitation process.

As run in graphics hardware, the Masking technique uses these masks to interdigitate a nine-tile image as shown in FIG. 6. Note that this nine-tile image may be a frame from a movie or animation sequence, or a still image. In either case, it is the application's responsibility to compose the nine-tile frame as an intermediate step before interdigitated rendering can occur. Initially both the masks (611) and nine-tile image (601) are created and stored as textures in the texture memory. The masks contain a value of 255 to wherever there is a window and 0 otherwise. Each of the views (602-610) in the nine-tile image is processed sequentially as follows: For the first view (602), the appropriate position in the nine-tile image (612) is scaled up proportionally (613) to a new image (614), which is the same size of the masks (611). This scaling process (613) can be a bilinear or Gaussian based operation, which is done on the graphics hardware by a known and efficient algorithm. The scaled up image is then "AND-ed" (615) with the corresponding mask 616, such that only the selected subpixels from that perspective view are enabled in the temporary image (617). Once all of the views (602-610) have been processed in a like manner, resulting in temporary images (617-625), they are "OR-ed" (626) together in to composite a final displayable image (627).

To eliminate the need for the temporary images and improving the performance of this masking interdigitation technique, the rendering is done directly to the back display buffer blending with the results already on the back buffer. The blending is possible because each of rendered views is black where there are no subpixels set. The blending parameters are set to add the rendered view in equal amounts to the back buffer.

In our DirectX application both the masks and nine-tile image are stored as textures. A simple quad, which is sized to fill the display area, is the only geometry used. The quad is drawn 9 times. A dual stage texture pipeline is set up where the first stage scales the views and the second stage performs the AND operation with the mask. Each of the rendering is composited onto the back buffer using Alpha Blending with source and destination set to 1. Finally the back buffer is presented.

An improvement to the masking technique is to eliminate the need for all of the masks. Each mask is the size of the display and is stored in the texture memory of the graphics card. These masks must not be compressed. Given the limited amount of texture memory available on current state of the art graphics cards, it is impossible to implement a masking technique on some high resolution displays. For example, a display with a resolution of 3840×2400 per color component will require a mask of size 4096×4096=16M per color component (in DirectX textures must be allocated in powers of 2). If nine masks are to be allocated, the memory requirement is 432M (9*16M*3 color components). This requirement far exceeds the current maximum on graphic cards of 256M.

One strategy is to use a single mask for the first view, and do a shifting operating to simulate the masks for the remaining views. The shifts can be implemented by adjusting the texture coordinates, which reference into the mask textures. By our observation, these simulated masks do not have to have a perfect match with the actual masks to still produce a useful autostereoscopic image.

Because the first mask will be shifted, it needs to be created at a size larger than the display. The larger the size, the better chances are that a good simulated mask will be found for the other views.

Shifting can only occur in pixel wide increments in the horizontal direction and scan line high increments in the vertical direction.

To determine the amount to shift each mask, we first determine the lenticular-width, that is, the width of a pixel in lenticules. This can be found by taking the inverse of the lenticular pitch (pixels/lenticule). We also need to determine the fractional lenticular shift for the view. This value is defined as the view number divided by the number of views.

When a mask is shifted by a pixel in horizontal direction, the lenticular offset changes by the lenticular-width. For each view, we need to find the number of pixel shifts that results in the fractional lenticular offset approximately equal to the fractional lenticular shift for the view.

As an example, if an adhered lenticular shift has a pitch of 1.5706 pixels per lenticule, the lenticular width would be 1/1.5706=0.6367 lenticules per pixel. For view 1 in a 9 view system, the shift offset would be 1/9=0.1111 lenticules.

When the mask is shifted on a given scan line, these the lenticular offsets and fractional offsets are calculated as given:

| Pixel Shift (pixels) | Lenticular offset (lenticules) | Fractional offset (lenticules) |
| --- | --- | --- |
| 0 | 0.0000 | 0.0000 |
| 1 | 0.6367 | 0.6367 |
| 2 | 1.2652 | 0.2652 |
| 3 | 1.8978 | 0.8978 |
| 4 | 2.5304 | 0.5304 |
| . | . | . |
| . | . | . |
| . | . | . |
| 310 | 196.1088 | 0.1088 |

The objective is to find a pixel shift amount that results in a fractional offset of 0.1111. By iterating over all allowable shifts, the optimum result of 0.1088 is found when the pixel shift is 310 pixels.

Shifts can also be found by searching in both a horizontal and vertical direction. When searching on multiple scanlines, an additional factor needs to be added to the shift offset to account for the slant of the lenticules.

There are two errors when using the simulated masks. The first is when a given subpixel is set in more than one mask. The second is when a given subpixel is not set in any of the masks. Both can be handled by initially drawing the first view in the back buffer without any masking. This will ensure full coverage of all subpixels. The remaining masks can be drawn on top. In the case of a subpixel that is set in more that one mask, the higher mask number will be drawn last.

The second interdigitation technique uses an advanced feature of contemporary graphics cards called Pixel Shading (also called Fragment Shading). Pixel Shaders work by having the same program executed for each pixel. The results of this program are the colors at that pixel. Our experience has shown with current generation cards, a pixel shader implementation of interdigitation is similar in speed to masking. With masks, multiple rendering passes of the screen quad must be performed with different textures active. This additional processing along with the memory requirements of the masks, and the ability to sharpen, can make the Pixel Shading technique a superior alternative in many cases.

Figure 7:
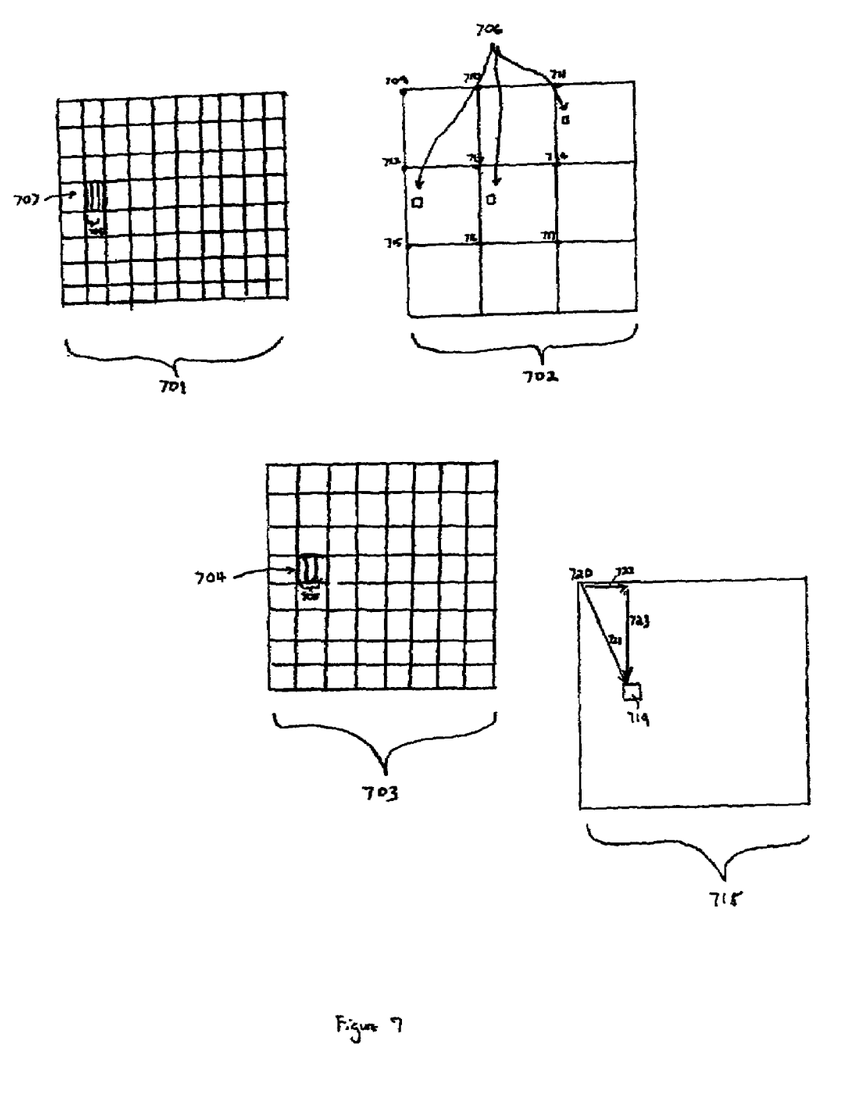
FIG. 7 describes the pixel shading interdigitation process.

The general description of the technique is as follows. As shown in FIG. 7, the inputs to this technique are the ViewMap (701) and the nine-tile image (702). The three subpixel components for all of the pixels in the display area (703) need to be calculated. Given a particular pixel (704) that is being calculated which comprises 3 subpixels (705), the ViewMap (701) is used to identify the three subpixel locations (706) in the nine-tile image (702) that will be used to form the pixel color. These subpixel locations (706) are represented as fractional offsets within the nine-tile image (702).

The nine-tile image, by definition, contains 9 tiles, each of which have a defined origin (709-717) in the upper left corner of the tile. These origins are used to reference locations with in the nine-tile image.

The calculation of the display area pixel's subpixels (705) is done by first identifying the corresponding pixel (707) in the ViewMap (701) and then obtaining the 3 subpixel view numbers values (708). These view numbers can then be used to determine which of the origin points (709-717) in the nine-tile image (702) to start offsetting from. The final nine-tile locations (706) are determined by offsetting from the origin a proportional amount.

An enlarged tile (718) has an upper left origin (720) and a unit (0.0-1.0) coordinate system. The subpixel location (719) is determined by starting at the upper left origin (720) and offsetting by a vector (721) which is defined by a horizontal (722) and vertical (723) components. The horizontal component is determined by the ratio of the horizontal display location of the current pixel (704) divided by the full size of the horizontal display area (703). Likewise, the vertical component is determined by the ratio of the vertical display location of the current pixel (704) divided by the full size of the vertical display area (703).

These final locations (706) are then used as texture coordinates to obtain the interpolated color values from the nine-tile image. This interpolation is well-known in the industry and can consist of linear or quadratic precision. The appropriate subpixels from these interpolated colors are then used to form the final color for the displayed pixel (704).

A Pixel Shader is a concise set of assembler language like steps that are executed at each display pixel. Pixel shaders are optimized to process vector data structures in a single operation. This implies that most of the subpixel operations are done in single steps.

In our DirectX application, a simple quad that fills the screen is the only graphic object that is rendered. The quad contains texture coordinates, which aid in determining the display location and the ViewMap location. The ViewMap and nine-tile images are stored as textures. The ViewMap texture contains the view number for each subpixel multiplied by 16 (e.g. view 5 is represented by 90 in the ViewMap). When the ViewMap is used in a texture operation by the interdigitating Pixel Shader, the color range 0-255 is mapped to 0.0-1.0 so this multiplication by 16 aids in improving the precision when computing the view number. Multiplying the results of the texture operation by 255/16=15.9375 and flooring the result to the next smallest integer determines the actual integer view number. The texture lookup (tex2D function call) into the ViewMap texture is done with Point Filtering so no blending of adjacent texels occurs. The texture lookup (tex2D function call) into the nine-tile texture is done with either linear or Gaussian filtering to allow for some blending. To prevent blending into neighboring tiles, the full range of texture coordinates is reduced by an amount equal to a single texel's width and height.

Figure 8:
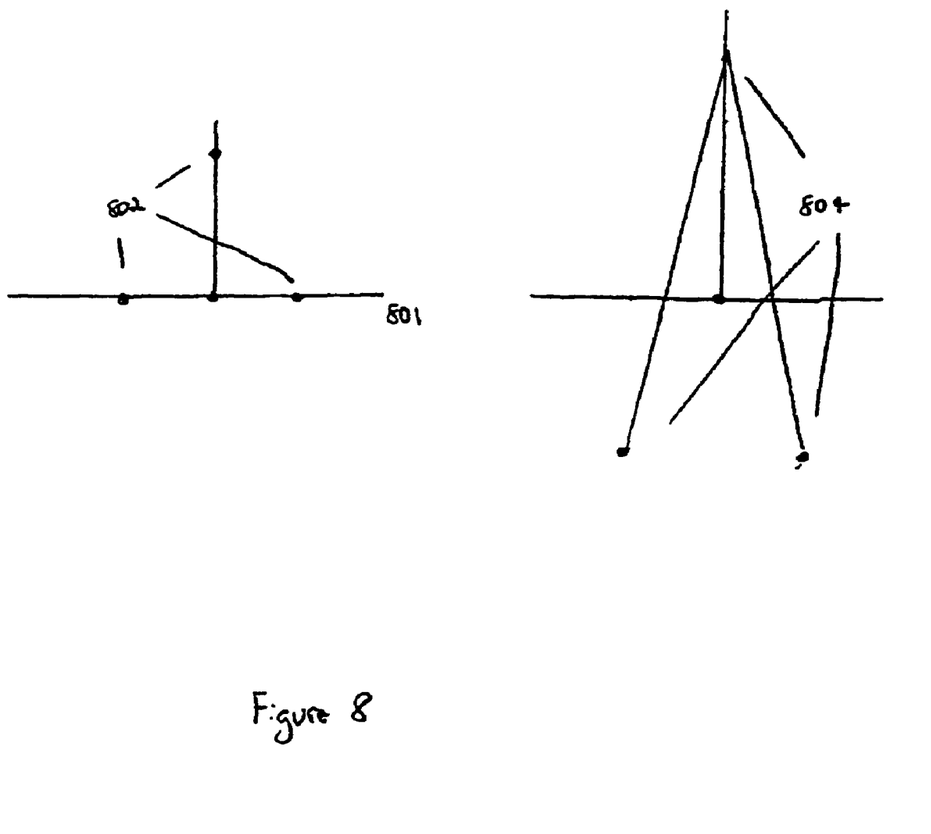
FIG. 8 is a diagram of the sharpening filter's function.

A post-interdigitation sharpening operation can be performed to enhance the final image. This enhancement is useful in bringing out more detail that would otherwise not be viewable. As shown in FIG. 8, convoluting the image with a simple 3×1 filter performs this sharpening. For each pixel, this filter only uses the left and right pixels to compute a sharpened value. No pixels above or below the given pixel are needed. The filter has been programmed to have a range of weights ranging from a no sharpening setting (801) with kernel weights (802) of (0.0,1.0,1.0) to a maximum sharpening setting (803) with kernel weights (804) of (−0.80, 2.60, 0.80). The values in the range are equally spaced among the settings. To perform the sharpening, the kernel is centered over the selected pixel, and each of the kernel components are multiplied by the covered pixel. The three sums are added and used as the resulting sharpened color value. In our implementation, the viewer is able to interactivity change the settings and see the results instantly allowing the viewer to quickly arrive at an optimal setting value.

A similar, but far more complex algorithm for producing the enhancement of an interdigitated stereoscopic image is described in U.S. Pat. Nos. 5,438,429, and 5,311,329. The "unsharp mask" algorithm is used, which is more computationally intensive and therefore results in a loss of speed when autostereoscopic images are played back through a media player which interdigitates on the fly, or when used in conjunction with an interactive application.

To implement this sharpening in our Pixel Shader, we store the results of a previous interdigitation as a texture. Again, a single quad object is used for the geometry, but this time there are 3 sets of texture coordinates. One set is used to map to the current pixel, one set is used to map to the left pixel, and one set is used to map to the right pixel. Using the weights as constants in the pixel shader, and given the current pixel location, we perform 3 texture lookups using the tex2D function, multiply each of the lookups by the filter weights, and finally sum together. The resulting value is used for the pixel color value.

The foregoing description is intended to be illustrative and not limiting.

We claim:

1. A system for interdigitating stereoscopic views, comprising:
    an image display unit having a display area with an aspect ratio, wherein the display area further includes a plurality of scan lines each having a plurality of pixels, each pixel being comprised of subpixels;
    a lenticular sheet affixed in intimate juxtaposition with the display area;
    an input buffer coupled to the display area and configured to store pixel data in n views, wherein each of the n views has a view aspect ratio similar to the aspect ratio of the display area;
    a plurality of masks, one corresponding to each of the n views, each mask having an opaque area and a plurality of transparent windows, each window corresponding to a selected subpixel location; and
    a software routine for interdigitating the n views while applying the corresponding mask.

2. A method for interdigitating multiple perspective views in a stereoscopic image viewing system having a display area and a lenticular sheet affixed in intimate juxtaposition with the display area, wherein the display area includes a plurality of scan lines each having a plurality of pixels, each pixel being comprised of subpixels, and wherein the display area has an aspect ratio, comprising:
    creating a map having the same resolution as the display area, wherein the map stores, on a storable medium, a value corresponding to each subpixel in the display area;
    creating and storing on the storable medium a frame having n views, wherein each of the n views has a view aspect ratio similar to the aspect ratio of the display area;
    creating and storing on the storable medium a plurality of masks, each mask corresponding to a unique one of the n views, each mask having an opaque area and a plurality of transparent windows, each window corresponding to a selected subpixel location; and
    interdigitating the n views while applying the corresponding mask and using the map to assign a value to each subpixel.

3. The apparatus of claim 1, wherein the pixel data forms part of a moving stereoscopic image.

4. The apparatus of claim 1, wherein opaque areas and transparent areas are different for each mask.

5. The apparatus of claim 1, wherein the software routine produces a single combined pixel data frame, the apparatus further comprising a post-interdigitation sharpener configured to receive the single combined pixel data frame and sharpen the single combined pixel data frame.

6. The apparatus of claim 1, wherein each mask is simulated and each masked area comprises a masked numerical coefficient that, when combined with pixel data, masks the pixel data, and each transparent area comprises a transparent numerical coefficient that, when combined with pixel data, enables passage of all pixel data.

7. The method of claim 2, wherein the pixel data forms part of a moving stereoscopic image.

8. The method of claim 2, wherein opaque areas and transparent areas are different for each mask.

9. The method of claim 2, wherein the interdigitating produces a single combined pixel data frame, the method further comprising performing post-interdigitation sharpening by receiving the single combined pixel data frame and sharpening the single combined pixel data frame.

10. The method of claim 2, wherein each mask is simulated and each opaque area comprises a masked numerical coefficient that, when combined with pixel data, masks the pixel data, and each transparent area comprises a transparent numerical coefficient that, when combined with pixel data, enables passage of all pixel data.

11. An apparatus configured to interdigitate multiple perspective views in a stereoscopic image viewing system having a display area and a lenticular sheet affixed in intimate juxtaposition with the display area having a plurality of pixels, each pixel being comprised of subpixels, and wherein the display area has an aspect ratio, comprising:
- a map creator configured to create a map having the same resolution as the display, wherein the map stores a value corresponding to each subpixel in the display area;
- a frame creator configured to create a frame having n views, wherein each of the n views has a view aspect ratio similar to the aspect ratio of the display area;
- a mask creator configured to create a plurality of masks, each mask corresponding to a unique one of the n views, each mask having an opaque area and a plurality of transparent windows, each window corresponding to a selected subpixel location; and
- an interdigitator configured to interdigitate the n views while applying the corresponding mask and using the map to assign a value to each subpixel.

12. The apparatus of claim 11, wherein the pixel data forms part of a moving stereoscopic image.

13. The apparatus of claim 11, wherein opaque areas and transparent areas are different for each mask.

14. The apparatus of claim 11, wherein the interdigitator produces a single combined pixel data frame, the apparatus further comprising a post interdigitation sharpener configured to receive the single combined pixel data frame and sharpen the single combined pixel data frame.

15. The apparatus of claim 11, wherein each mask is simulated and each masked area comprises a masked numerical coefficient that, when combined with pixel data, masks the pixel data, and each transparent area comprises a transparent numerical coefficient that, when combined with pixel data, enables passage of all pixel data.

* * * * *